(12) United States Patent
Miller et al.

(10) Patent No.: US 7,570,157 B2
(45) Date of Patent: Aug. 4, 2009

(54) METHOD AND APPARATUS FOR ADJUSTING THE PRESSURE SENSOR MEASUREMENT RANGE IN A TIRE PRESSURE MONITORING SYSTEM

(75) Inventors: Thomas Miller, Ann Arbor, MI (US); Thomas McQuade, Ann Arbor, MI (US); Greg Swadling, Milford, MI (US); Karl Wojcik, Sterling Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 302 days.

(21) Appl. No.: 11/163,586

(22) Filed: Oct. 24, 2005

(65) Prior Publication Data

US 2007/0090935 A1    Apr. 26, 2007

(51) Int. Cl.
*B60C 23/00* (2006.01)
*G01F 23/00* (2006.01)

(52) U.S. Cl. .......................................... 340/445; 702/50
(58) Field of Classification Search ............ 340/426.33, 340/442
See application file for complete search history.

(56) References Cited

U.S. PATENT DOCUMENTS

| | | |
|---|---|---|
| 1,948,427 A | 2/1934 | Moecker |
| 1,954,153 A | 4/1934 | Taylor |
| 2,274,557 A | 2/1942 | Morgan et al. |
| 2,578,358 A | 12/1951 | Jellison |
| 2,589,623 A | 3/1952 | Merritt et al. |
| 3,852,717 A | 12/1974 | Hosaka et al. |
| 3,911,855 A | 10/1975 | Haven |
| 3,965,847 A | 6/1976 | Deming |
| 3,974,477 A | 8/1976 | Hester |
| 4,051,803 A | 10/1977 | Arnone |
| 4,316,176 A | 2/1982 | Gee et al. |
| 4,376,931 A | 3/1983 | Komatu et al. |
| 4,443,785 A | 4/1984 | Speranza |

(Continued)

OTHER PUBLICATIONS

U.S. Appl. No. 10/064,691, filed Aug. 7, 2002, Talukder.

(Continued)

*Primary Examiner*—Daniel Wu
*Assistant Examiner*—John F Mortell
(74) *Attorney, Agent, or Firm*—Angela M. Brunetti; Fredrick Owens

(57) ABSTRACT

A tire pressure monitoring system (12) for a vehicle (10) has a pressure sensor circuit (16A) that includes an ECU (95), a transmitter/receiver (90), and pressure sensor (94). A method of operating a tire pressure monitoring system includes calibrating a tire pressure sensor circuit in a first range and a second range and generating a first calibration data for the first range and second calibration data for the second range. The first calibration data and the second calibration data are stored in a memory of the tire pressure sensing circuit (16A). A data signal corresponding to the pressure is generated. The first or second calibration data is generated in response to the range of the data signal to form a selected calibration. The data signal is calibrated with the selected calibration to form a pressure indicative signal. The pressure indicative signal is transmitted to a receiver (28) within the vehicle (10) with a range status corresponding to the selected calibration. A pressure signal is formed in response to the pressure indicative signal and the range status and the tire pressure monitoring system is operated with the pressure signal.

17 Claims, 3 Drawing Sheets

U.S. PATENT DOCUMENTS

| | | | |
|---|---|---|---|
| 4,494,106 A | 1/1985 | Smith et al. | |
| 4,510,484 A | 4/1985 | Snyder | |
| 4,574,267 A | 3/1986 | Jones | |
| 4,742,476 A | 5/1988 | Schwartz et al. | |
| 5,061,917 A | 10/1991 | Higgs et al. | |
| 5,109,213 A | 4/1992 | Williams | |
| 5,463,374 A | 10/1995 | Mendez et al. | |
| 5,517,853 A | 5/1996 | Chamussy | |
| 5,569,848 A | 10/1996 | Sharp | |
| 5,583,482 A | 12/1996 | Chamussy et al. | |
| 5,587,698 A | 12/1996 | Genna | |
| 5,589,815 A | 12/1996 | Nishihara et al. | |
| 5,600,301 A | 2/1997 | Robinson, III | |
| 5,602,524 A | 2/1997 | Mock et al. | |
| 5,612,671 A | 3/1997 | Mendez et al. | |
| 5,656,993 A | 8/1997 | Coulthard | |
| 5,661,651 A | 8/1997 | Geschke et al. | |
| 5,717,376 A | 2/1998 | Wilson | |
| 5,721,528 A | 2/1998 | Boesch et al. | |
| 5,741,966 A | 4/1998 | Handfield et al. | |
| 5,790,016 A | 8/1998 | Konchin et al. | |
| 5,801,306 A | 9/1998 | Chamussy et al. | |
| 5,808,190 A | 9/1998 | Ernst | |
| 5,838,229 A | 11/1998 | Robinson, III | |
| 5,853,020 A | 12/1998 | Widner | |
| 5,880,363 A | 3/1999 | Meyer et al. | |
| 5,913,240 A | 6/1999 | Drahne et al. | |
| 5,926,087 A | 7/1999 | Busch et al. | |
| 5,939,977 A | 8/1999 | Monson | |
| 5,959,202 A | 9/1999 | Nakajima | |
| 5,963,128 A | 10/1999 | McClelland | |
| 5,965,808 A | 10/1999 | Normann et al. | |
| 5,969,239 A | 10/1999 | Tromeur et al. | |
| 5,990,785 A | 11/1999 | Suda | |
| 5,999,091 A | 12/1999 | Wortham | |
| 6,002,327 A | 12/1999 | Boesch et al. | |
| 6,034,597 A | 3/2000 | Normann et al. | |
| 6,043,738 A | 3/2000 | Stewart et al. | |
| 6,046,672 A | 4/2000 | Pearman | |
| 6,078,252 A | 6/2000 | Kulczycki et al. | |
| 6,111,520 A | 8/2000 | Allen et al. | |
| 6,161,071 A | 12/2000 | Shuman et al. | |
| 6,199,575 B1 | 3/2001 | Widner | |
| 6,204,758 B1 | 3/2001 | Wacker et al. | |
| 6,218,936 B1 | 4/2001 | Imao | |
| 6,225,895 B1 | 5/2001 | Bigelow, Jr. | |
| 6,232,875 B1 | 5/2001 | DeZorzi | |
| 6,246,317 B1 | 6/2001 | Pickornik et al. | |
| 6,259,361 B1 | 7/2001 | Robillard et al. | |
| 6,271,748 B1 | 8/2001 | Derbyshire et al. | |
| 6,275,148 B1 | 8/2001 | Takamura et al. | |
| 6,275,231 B1 | 8/2001 | Obradovich | |
| 6,278,363 B1 | 8/2001 | Bezek et al. | |
| 6,278,379 B1 | 8/2001 | Allen et al. | |
| 6,292,096 B1 | 9/2001 | Munch et al. | |
| 6,293,147 B1 | 9/2001 | Parker et al. | |
| 6,327,570 B1 | 12/2001 | Stevens | |
| 6,339,736 B1 | 1/2002 | Moskowitz et al. | |
| 6,359,554 B1 * | 3/2002 | Skibinski et al. | 340/438 |
| 6,369,703 B1 | 4/2002 | Lill | |
| 6,385,511 B1 | 5/2002 | Fondeur et al. | |
| 6,385,553 B1 * | 5/2002 | Naito et al. | 702/138 |
| 6,446,502 B1 | 9/2002 | Normann et al. | |
| 6,448,891 B2 | 9/2002 | Barnett | |
| 6,448,892 B1 | 9/2002 | Delaporte | |
| 6,453,737 B2 | 9/2002 | Young et al. | |
| 6,463,798 B2 | 10/2002 | Niekerk et al. | |
| 6,498,967 B1 | 12/2002 | Hopkins et al. | |
| 6,518,876 B1 | 2/2003 | Marguet et al. | |
| 6,591,671 B2 | 7/2003 | Brown | |
| 6,612,165 B2 | 9/2003 | Juzswik et al. | |
| 6,631,637 B2 | 10/2003 | Losev | |
| 6,667,687 B1 | 12/2003 | DeZorzi | |
| 6,672,150 B2 | 1/2004 | Delaporte | |
| 6,694,807 B2 | 2/2004 | Chuang | |
| 6,745,623 B2 * | 6/2004 | Schmitt | 73/146 |
| 6,745,624 B2 | 6/2004 | Porter | |
| 6,750,762 B1 | 6/2004 | Porter | |
| 6,771,169 B1 | 8/2004 | Kaminski | |
| 6,782,741 B2 | 8/2004 | Imbert | |
| 6,784,794 B1 | 8/2004 | McQuade | |
| 6,805,000 B1 | 10/2004 | Sheikh-Bahaie | |
| 6,850,155 B1 | 2/2005 | McQuade | |
| 6,900,725 B1 | 5/2005 | Berry | |
| 6,952,160 B1 | 10/2005 | Bennie | |
| 6,982,636 B1 | 1/2006 | Bennie | |
| 6,985,076 B1 | 1/2006 | Bennie | |
| 7,116,218 B2 * | 10/2006 | Ogawa et al. | 340/447 |
| 7,251,992 B2 * | 8/2007 | Petrucelli | 73/146 |
| 2002/0008718 A1 | 1/2002 | Obradovich | |
| 2003/0076222 A1 * | 4/2003 | Fischer et al. | 340/442 |
| 2003/0098787 A1 * | 5/2003 | Lin | 340/442 |
| 2003/0156022 A1 * | 8/2003 | Saheki et al. | 340/442 |
| 2003/0164758 A1 * | 9/2003 | King et al. | 340/442 |
| 2005/0011257 A1 | 1/2005 | Modawell | |
| 2005/0200464 A1 | 9/2005 | Bennie | |

OTHER PUBLICATIONS

U.S. Appl. No. 10/905,093, filed Dec. 15, 2004, Miller.
U.S. Appl. No. 10/908,430, filed May 11, 2005, McQuade.
U.S. Appl. No. 10/908,364, filed May 9, 2005, Phalak.
U.S. Appl. No. 11/161,835, filed Aug. 18, 2005, Miller.
U.S. Appl. No. 11/164,624, filed Nov. 30, 2005, Pearce.

* cited by examiner

METHOD AND APPARATUS FOR ADJUSTING THE PRESSURE SENSOR MEASUREMENT RANGE IN A TIRE PRESSURE MONITORING SYSTEM

TECHNICAL FIELD

The present invention relates generally to a tire pressure monitoring system for an automotive vehicle, and more particularly, to a method and system for adjusting the pressure sensor range.

BACKGROUND OF THE INVENTION

Various types of pressure sensing systems for monitoring the pressure within the tires of an automotive vehicle have been proposed. Such systems generate a pressure signal using an electromagnetic (EM) signal which is transmitted to a receiver. The pressure signal corresponds to the pressure within the tire. When the tire pressure drops below a predetermined pressure, an indicator is used to signal the vehicle operator of the low pressure. Many vehicles require different tire pressures in the front of the vehicle and the rear of the vehicle. Therefore, it is important to know the relative position of the pressure sensor and thus the tires relative to the vehicle.

The National Highway Traffic Safety Administration is requiring a phase in of tire pressure monitoring systems in vehicles. Tire pressure monitoring systems are used on passenger vehicles and heavy-duty vehicles. In order to maintain the pressure measurement tolerance required to meet regulatory requirements, the tire pressure sensor has to be calibrated with respect to the target application. Typically, this means passenger vehicles and heavy-duty vehicles require different pressure sensors. However, requiring different pressure sensors increases the overall cost to the manufacturer.

It would therefore be desirable to automatically adjust the tire pressure sensor calibration to the applied pressure so that a single tire pressure sensor may be used for different applications.

SUMMARY OF THE INVENTION

The present invention provides a system and method for adjusting the pressure sensor range of a pressure sensor.

In one aspect of the invention, a method of operating a tire pressure monitoring system for a vehicle includes calibrating a tire pressure sensor circuit in a first range and a second range, generating first calibration data for the first range, generating second calibration data for the second range, and storing the first calibration data and the second calibration data in a memory of the tire pressure sensing circuit. The method further includes generating a data signal corresponding to a pressure and selecting a first or second calibration data in response to the range of the data signal to form a selected calibration. The method also includes calibrating the data signal with the selected calibration to form a pressure indicative signal. The method includes transmitting the pressure indicative signal to the receiver with the range status corresponding to the selected calibration, generating a pressure signal in response to the pressure indicative signal and the range status, and operating the tire pressure monitoring system with the pressure signal.

In a further aspect of the invention, a tire pressure monitoring system includes a tire pressure sensor circuit for a tire pressure monitoring system for a vehicle includes a memory having first calibration data and second calibration data corresponding to a respective first range and a second range, a pressure sensor generating a data signal corresponding to a tire pressure, a tire transmitter, and a control unit coupled to the memory and the tire transmitter. The control unit selects the first or second calibration data in response to the range of the data signal to form a selected calibration, calibrating the data signal with the selected calibration to form a pressure indicative signal and causing the transmitter to transmit the pressure indicative signal and range status corresponding to the selected calibration.

One advantage of the invention is that the pressure sensors may be commonized for a manufacturer. This reduces the overall cost of the system by commonizing components.

Another advantage of the system is that the range may be tailored to a smaller range and thus the resolution of the pressure sensors may be increased. Increasing the resolution of the sensors increases the accuracy of data and decreases false warnings.

Other advantages and features of the present invention will become apparent when viewed in light of the detailed description of the preferred embodiment when taken in conjunction with the attached drawings and appended claims.

DETAILED DESCRIPTION OF THE PREFERRED EMBODIMENT

Figure 1:
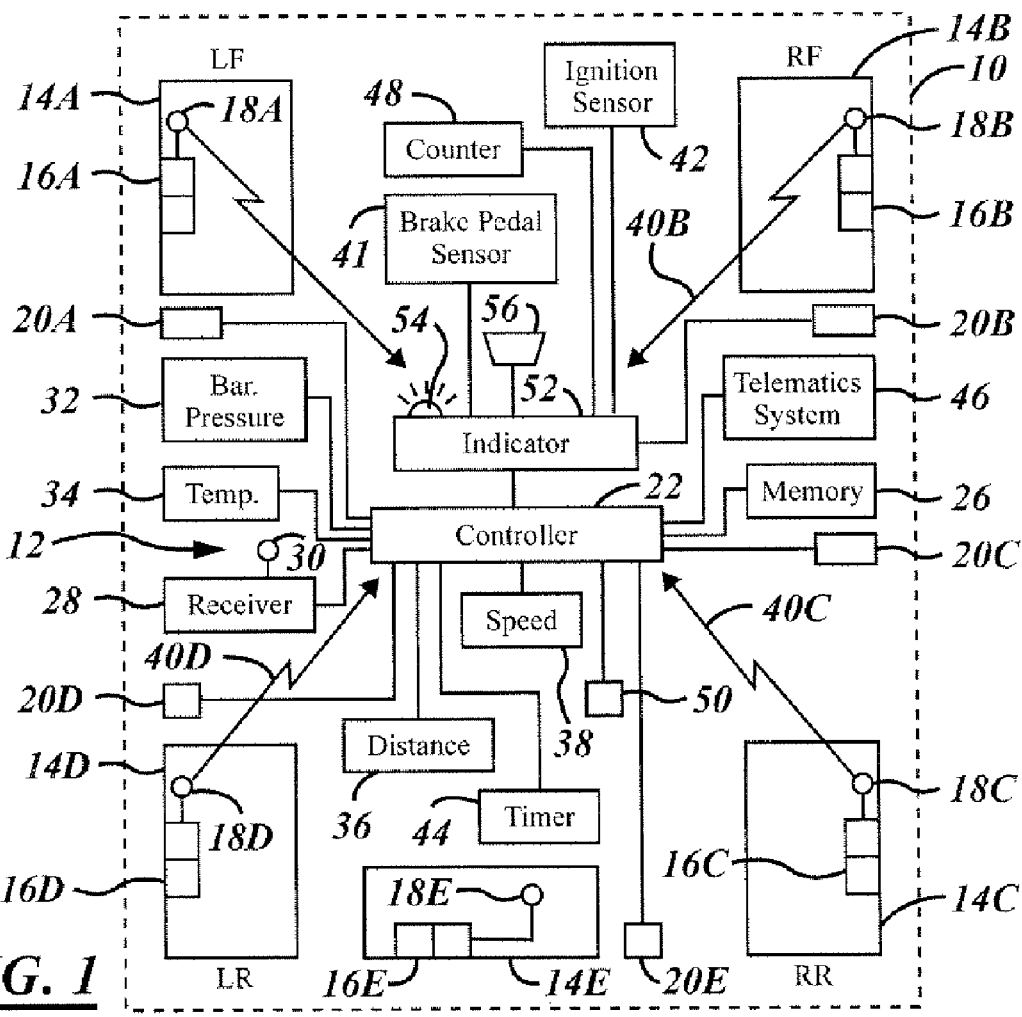
FIG. 1 is a block diagrammatic view of a pressure monitoring system according to the present invention.

In the following figures, the same reference numerals will be used to illustrate the same components. Those skilled in the art will recognize that the various components set forth herein could be changed without varying from the scope of the invention.

Referring now to FIG. 1, an automotive vehicle 10 has a pressure monitoring system 12 for monitoring the air pressure within a left front tire 14a, a right front tire 14b, a right rear tire 14c, and a left rear tire 14d. Each tire 14a-14d has a respective tire pressure sensor circuit 16a, 16b, 16c, and 16d, each of which has a respective antenna 18a, 18b, 18c, and 18d. Each tire is positioned upon a corresponding wheel.

A fifth tire or spare tire 14e is also illustrated having a tire pressure sensor circuit 16e and a respective antenna 18e. Although five wheels are illustrated, the pressure of various numbers of wheels may be increased. For example, the present invention applies equally to vehicles such as pickup trucks that have dual wheels for each rear wheel. Also, various numbers of wheels may be used in a heavy-duty truck application having dual wheels at a number of locations. Further, the present invention is also applicable to trailers and extra spares.

Each tire 14 may have a respective initiator 20a-20e positioned within the wheel wells adjacent to the tire 14. Initiator 20 generates a low frequency RF signal initiator and is used to initiate a response from each wheel so that the position of each wheel may be recognized automatically by the pressure monitoring system 12. Initiators 20a-20e are preferably coupled directly to a controller 22. In commercial embodiments where the position programming is done manually, the initiators may be eliminated.

Controller 22 is preferably a microprocessor-based controller having a programmable CPU that may be programmed to perform various functions and processes including those set forth herein.

Controller 22 has a memory 26 associated therewith. Memory 26 may be various types of memory including but not limited to ROM, RAM, Flash and EEPROM. Memory 26 is illustrated as a separate component. However, those skilled in the art will recognize controller 22 may have memory 26 therein. Memory 26 is used to store various thresholds, calibrations, tire characteristics, wheel characteristics, serial numbers, conversion factors, temperature probes, spare tire operating parameters, and other values needed in the calculation, calibration and operation of the pressure monitoring system 12. For example, memory may contain a table that includes the sensor identification thereof. Also, the warning statuses of each of the tires may also be stored within the table.

Controller 22 is also coupled to a receiver 28. Although receiver 28 is illustrated as a separate component, receiver 28 may also be included within controller 22. Receiver 28 has an antenna 30 associated therewith. Receiver 28 is used to receive pressure and various information from tire pressure circuits 16a-16e. Controller 22 is also coupled to a plurality of sensors. Such sensors may include a barometric pressure sensor 32, an ambient temperature sensor 34, a distance sensor 36, a speed sensor 38, a brake pedal sensor 40, and an ignition sensor 42. Of course, various other types of sensors may be used. Barometric pressure sensor 32 generates a barometric pressure signal corresponding to the ambient barometric pressure. The barometric pressure may be measured directly, calculated, or inferred from various sensor outputs. The barometric pressure compensation is preferably used but is not required in calculation for determining the pressure within each tire 14. Temperature sensor 34 generates an ambient temperature signal corresponding to the ambient temperature and may be used to generate a temperature profile.

Distance sensor 36 may be one of a variety of sensors or combinations of sensors to determine the distance traveled for the automotive vehicle. The distance traveled may merely be obtained from another vehicle system either directly or by monitoring the velocity together with a timer 44 to obtain a rough idea of distance traveled. Speed sensor 38 may be a variety of speed sensing sources commonly used in automotive vehicles such as a toothed wheel used in anti-lock braking systems, or a transmission sensor.

Timer 44 may also be used to measure various times associated with the process set forth herein. The timer 44, for example, may measure the time the spare tire is stowed, measure a time after an initiator signal or measure the time and duration for transmitting an initiator signal.

Brake pedal sensor 41 may generate a brake-on or brake-off signal indicating that the brake pedal is being depressed or not depressed, respectively. Brake pedal sensor 41 may be useful in various applications such as the programming or calibrating of the pressure monitoring system 12.

Ignition sensor 42 may be one of a variety of types of sensors to determine if the ignition is powered on. When the ignition is on, a run signal may be generated. When the ignition is off, an off signal is generated. A simple ignition switch may act as an ignition sensor 42. Of course, sensing the voltage on a particular control line may also provide an indication of whether the ignition is activated. Preferably, pressure monitoring system 12 may not be powered when the ignition is off. However, in one constructed embodiment, the system receives information about once an hour after the ignition has been turned off.

An optional telemetric system 46 may be used to communicate various information to and from a central location from a vehicle. For example, the control location may keep track of service intervals and use and inform the vehicle operator service is required.

A counter 48 may also be included in control system 12. Counter 48 may count, for example, the number of times a particular action is performed. For example, counter 48 may be used to count the number of key-off to key-on transitions. Of course, the counting function may be inherent in controller 22.

Controller 22 may also be coupled to a button 50 or plurality of buttons 50 for inputting various information, resetting the controller 22, or various other functions as will be evident to those skilled in the art through the following description.

Controller 22 may also be coupled to an indicator 52. Indicator 52 may include but is not limited to an incandescent indicator light, LED, LCD, or display panel 54, which generates a visual signal, or an audible device 56 such as a speaker or buzzer that generates an audible signal. Indicator 52 may provide some indication as to the operability of the system such as confirming receipt of a signal such as a calibration signal or other commands, warnings, and controls as will be further described below. Indicator may be an LED or LCD panel used to provide commands to the vehicle operator when manual calibrations are performed. The telematics display may also be used as an indicator 52.

Figure 2:
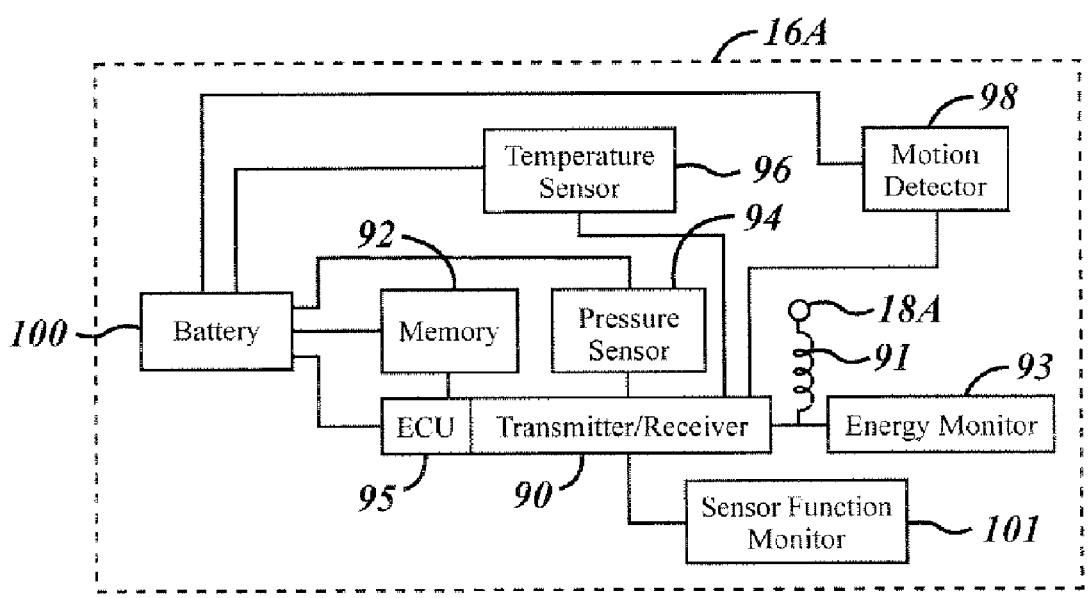
FIG. 2 is a block diagrammatic view of a pressure transmitter according to the present invention.

Referring now to FIG. 2, a typical tire pressure sensor circuit 16a is illustrated. Although only one tire pressure sensor circuit 16 is shown, each may be commonly configured. Pressure monitoring system 12 has a transmitter/receiver or transceiver 90. Transmitter/receiver 90 is coupled to antenna 18a for transmitting various information to receiver 28. The antenna 18 may, for example, be a coil and thus a sensor coil. An energy monitor circuit 93 may be a separate circuit or included in transmitter/receiver 90. The circuit 93 is used to determine an amount of energy in the coil. The energy is energy induced from the initiator. The receiver portion may be used to receive an activation signal for an initiator located at each wheel. The pressure sensor may have various components such as a memory 92, a pressure sensor 94 for determining the pressure within the tire, a temperature sensor 96 for determining the temperature within the tire, and a motion detector 98 which may be used to activate the pressure sensing system. The initial message is referred to as a "wake" message, meaning the pressure sensing circuit is now activated to send its pressure transmissions and the other data. An electronic control unit (ECU) 95 may be coupled within the circuit to perform various calculations including a pressure calibration calculation.

Memory 92 may include various information such as a serial number, calibration data and the like.

Each of the transceiver 90, memory 92, pressure sensor 94, ECU 95, temperature sensor 96, and motion sensor 98 are coupled to battery 100. Battery 100 is preferably a long-life battery capable of lasting through the life of the tire.

A sensor function monitor 101 may also be incorporated into tire pressure sensor circuit 16. Sensor function monitor 101 generates an error signal when various portions of the tire pressure circuit are not operating or are operating incorrectly. Also, sensor function monitor may generate a signal indicating that the circuit 16 is operating normally.

Figure 3:
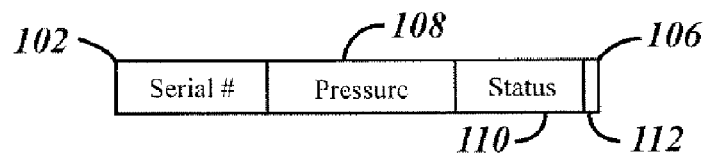
FIG. 3 is a diagrammatic view of a digital word from a pressure transmitter.

Referring now also to FIG. 3, a word 102 generated by the tire pressure sensor circuit 16 of FIG. 2 is illustrated. Word 102 may comprise a transmitter identification serial number portion 104 followed by a data portion 106 in a predetermined format. For example, data section 106 may include a pressure information 108 followed by a plurality of status bits 110. The status bits 110 may include a range portion 112 having one or two bits indicative of a range. Motion detector 28 may initiate the transmission of the word 102 to the transmitter/receiver 90. The word 102 is preferably such that the receiver 28 is able to decode the information and validate the word while providing the identification number or serial number, the pressure, the temperature, status and a sensor function.

Figure 4:
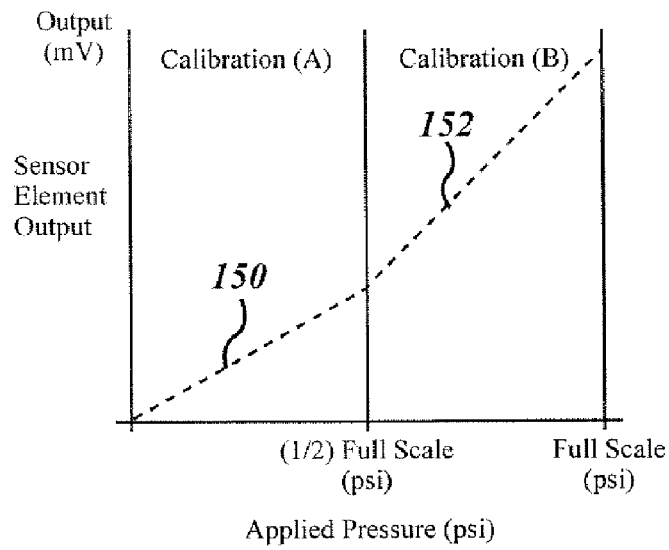
FIG. 4 is a plot of sensor element output versus applied pressure for a system in which the calibration is performed for two different ranges of outputs.

Referring now to FIG. 4, a plot of sensor element output versus applied pressure is illustrated for a two-calibration system. As can be seen in portion 150 and 152, two different calibrations generate a different slope indicating different calibration data. In this example, the calibration data is divided for half scale and full scale. In a construction embodiment, arbitrary limits may be provided for the scales. Rather than half scale and full scale, various other types of divisions may take place including ⅓ and ⅔ scale or the like.

Figure 5:
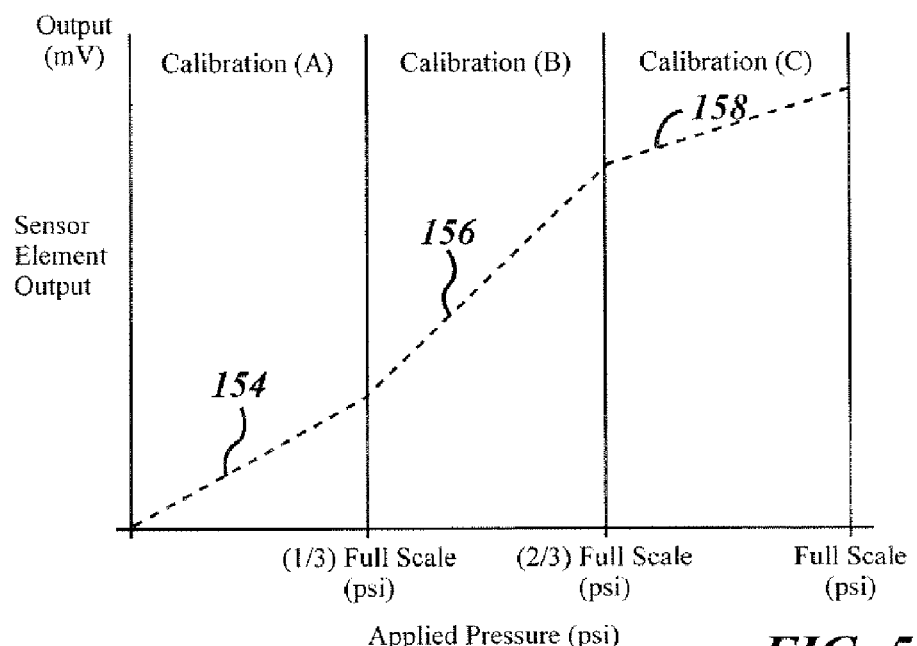
FIG. 5 is a sensor element versus applied pressure plot of a three-calibration plot.

Referring now to FIG. 5, a three-calibration range is illustrated having three different slopes represented by lines 154, 156 and 158. In this example, the calibrations correspond to ⅓, ⅔ and full scale readings. Similar to that described above, these readings may also be in various locations not ⅓ and ⅔.

Figure 6:
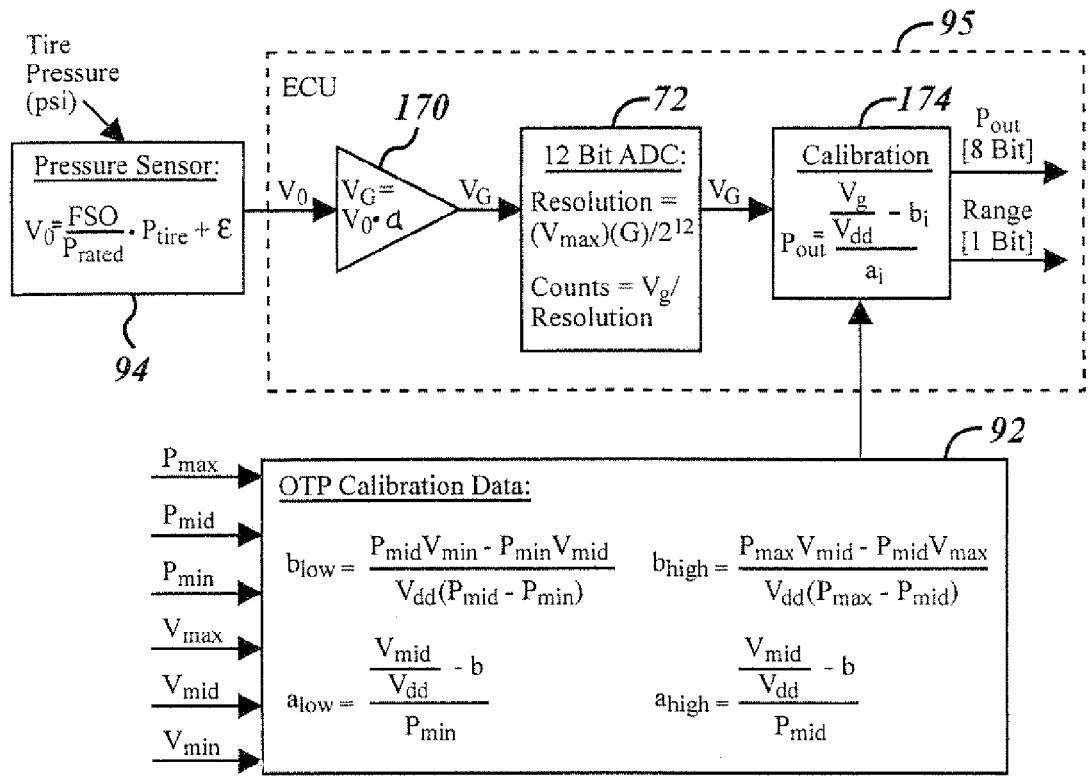
FIG. 6 is a flow chart illustrating a method of operating a tire pressure monitoring system according to the present invention.

Referring now to FIG. 6, a sensor block diagram is illustrated. Various formulas associated with a sensor are illustrated. The tire pressure sensor 94 has a formula therein that corresponds to a transfer function for the pressure transducer. The transfer function for the pressure transducer is given by:

$$V_e = \frac{FSO}{P_{rated}} \cdot P_{tire} + \varepsilon \tag{X}$$

FSO is the full-scale output of the sensor $P_{rated}$ is the maximum rated pressure of the sensor $\varepsilon$ is the error of the sensor The quantities above are provided in the specification for the sensor. The applied tire pressure $P_{tire}$ is the variable desired to be measured and transmitted to the TPMS receiver in the vehicle. A gain amplifier 170 is provided within the ECU 95. The gain amplifier provides a gain to the output of the pressure sensor. This improves utilization of the entire range of resolution at the analog-to-digital stage represented by an analog-to-digital converter 172. The amplified analog signal is converted to a digital signal using standard analog-to-digital conversion. Of course, other various lengths of bit conversions may be used such as 8-bit, which are common in the industry. By way of example, 12-bit is used in the following description. The digitally converted signal is provided to a calibration stage 174 for calibration. The calibration stage 174 has two outputs. The first output is given by:

$$P_{out} = \frac{\frac{V_G}{V_{dd}} - b_i}{a_i} \tag{Y}$$

The offset b and gain a vary depending on the applied pressure. The ECU determines this by the counts of the 12-bit analog-to-digital converter. The maximum number of counts given by a 12-bit converter is $2^{12}$ which equals 4096. If the measured pressure results in a total count of less than 4096/2, or 2048, then we know that the pressure sensor is operating in a low pressure range. In this case the ECU would calibrate to the low pressure data. Otherwise, the sensor will calibrate to the high pressure range. The calibrated pressure data is then output using 8-bits. The second output provided by the calibration range is the status bit. When the sensor is operating in the low pressure range the status bit will be set to 0 and the status bit will be set to 1 operating in the high range. Of course, the above description is set forth for a two calibration system. A multiple calibration system may provide a 2-bit range. A 2-bit range will allow up to four calibrations.

The memory 92 may include one-time programmable data that is set forth therein. The one-time programmable data may include a calibration for a described above, which is the gain, and b, which is the calibrated offset. The calibrated offset b and the gain a may be determined as set forth in equations (Z). Thus, the general linear transfer function may be characterized by:

$$b = \frac{P_{max} \cdot V_{min} - P_{min} \cdot V_{max}}{V_{dd}(P_{max} - P_{min})} \tag{Z}$$

$$a = \frac{\frac{V_{min} - b}{V_{dd}}}{P_{min}}$$

The general linear transfer function is then characterized:

$$V_{out} = V_{dd}(a \cdot P_a + b) \tag{Z1}$$

Figure 7:
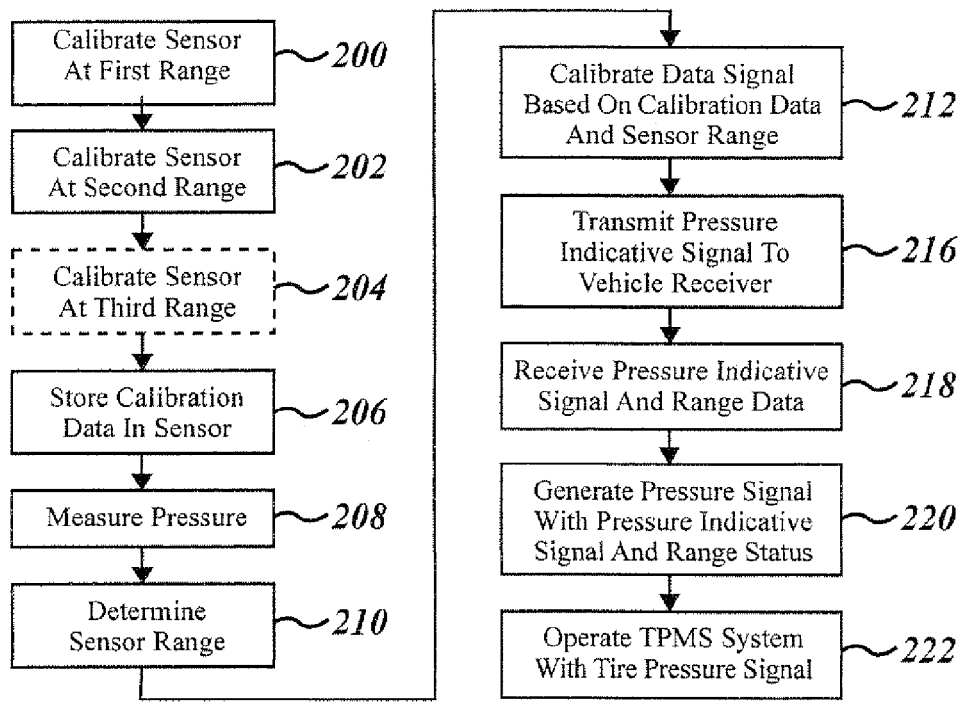
FIG. 7 is flow chart of the method of operating the present invention.

Referring now to FIG. 7, the sensor may be calibrated in several different calibrations for a pressure sensor range. In the following description, two divisions are provided for a single range. In step 200, the sensor is calibrated at a first range, in step 202 the sensor is calibrated at a second range, and if required, the sensor is calibrated at a third range in step 204. As mentioned above, step 204 may be optional if only two divisions are provided for the sensor range. The calibration process may be performed by taking two measurements at the minimum applied pressure $P_{min}$ and maximum applied pressure $P_{max}$. The respective voltage from the sensor is recorded in each case. It should be noted that the voltage is the output of the pressure sensor. The calibrated offset and the gain a are determined as set forth above. Typically, a remote tire pressure sensor is calibrated with a gain and offset with respect to the application. For example, a passenger vehicle may calibrate to a minimum pressure of 10 psi and a maximum pressure of 50 psi. Likewise, a heavy-duty application may calibrate to 50 and 100 psi, respectively. Therefore, only the difference between the heavy-duty application and a passenger application would be in the calibration data. The idea is to calibrate a single pressure sensor with sets of calibration parameters. As mentioned before, the sensor transmits a protocol of data, which contains the pressure data and status bits. Therefore, one sensor may be used with both sets of calibration data. The sensor would then automatically calibrate to the applied pressure and notify the receiver via the status bit to the range that the pressure data refers to. In step 206, the calibration data is stored in the memory of the sensor.

In step 208, a measurement of pressure for the particular tire is provided. The output of step 208 is a data signal corresponding to the pressure. The data signal may, for example, be an actual pressure indication or a voltage corresponding to pressure. In step 210, the sensor determines the range at which the pressure sensor is operating. In step 212, the data signal is calibrated based upon the calibration data and the sensor range, resulting in a pressure indicative signal. That is, the sensor range is used to select the proper calibration data. In step 216, the pressure indicative signal is transmitted to the receiver with a range status corresponding to the selected calibration. Without the range status, the pressure indicative signal would be meaningless. That is, the receiver on the vehicle must learn to which calibration the pressure indicative signal refers.

In step 218, the pressure indicative signal and the range data are received at the vehicle receiver. In step 220, the vehicle receiver or the controller is used to generate a pressure signal with the pressure indicative signal and the range status. The range status tells the controller which range the pressure signal refers to. This information is used to convert the pressure indicative signal to a pressure signal. The pressure signal is then provided to the tire pressure monitoring system. In step 222, the tire pressure monitoring system operates the indicator 52 with the tire pressure signal from step 220. As mentioned above, the tire pressure monitoring system may compare the pressure signal to various thresholds to determine if over-inflation, under-inflation, or a trend of deflation is found in the particular location.

While particular embodiments of the invention have been shown and described, numerous variations and alternate embodiments will occur to those skilled in the art. Accordingly, it is intended that the invention be limited only in terms of the appended claims.

What is claimed is:

1. A method of operating a tire pressure monitoring system for a vehicle comprising:
    calibrating a tire pressure sensor circuit in a first range associated with a first vehicle structure and a second range associated with a second vehicle structure;
    generating first calibration data for the first range;
    generating second calibration data for the second range;
    storing the first calibration data and the second calibration data in a memory of the tire pressure sensor circuit;
    generating a data signal corresponding to a pressure;
    selecting the calibration data in response to a relationship of the data signal to the first and second ranges to form a selected calibration for either the first range or the second range;
    calibrating the data signal with the selected calibration to form a pressure indicative signal;
    transmitting the pressure indicative signal to a receiver with a range status corresponding to the selected calibration;
    generating a pressure signal in response to the pressure indicative signal and the range status; and
    operating a tire pressure monitoring indicator with the pressure signal.

2. A method as recited in claim 1 wherein the step of transmitting is performed by radio frequency.

3. A method as recited in claim 1 further comprising calibrating the tire pressure sensor circuit in at least a third range associated with at least a third vehicle structure.

4. A method as recited in claim 3 further comprising generating calibration data for at least a third range associated with the at least a third vehicle structure.

5. A method as recited in claim 4 further comprising storing the calibration data in the memory.

6. A method as recited in claim 4 wherein selecting the calibration data comprises selecting the calibration data in response to a relationship of the data signal to the first range, the second range, and the at least a third range to form a selected calibration.

7. A method as recited in clam 1 further comprising storing calibration data in a memory coupled to a controller on-board the vehicle.

8. A method as recited in claim 1 wherein the data signal corresponds to a voltage.

9. A tire pressure circuit for a tire pressure monitoring system for a vehicle comprising:
    a memory having first calibration data and second calibration data corresponding to a first range associated with a first vehicle structure and at least a second range associated with at least a second vehicle structure;
    a pressure sensor generating a data signal corresponding to a tire pressure;
    a tire transmitter; and
    a control unit coupled to the memory and the tire transmitter, said control unit selecting the calibration data in response to a relationship of the data signal to the first range and the at least a second range to form a selected calibration, calibrating the data signal with the selected calibration to form a pressure indicative signal and causing the transmitter to transmit the pressure indicative signal and a range status corresponding to the selected calibration.

10. A method comprising:
    providing a memory in a tire pressure sensor circuit having first calibration data associated with a first vehicle structure and second calibration data associated with a second vehicle structure stored therein;
    generating a data signal corresponding to a pressure;
    determining a range of an applied tire pressure independent of vehicle dynamics of the data signal;
    selecting calibration data in response to the range to form a selected calibration for either the first range or the second range;
    calibrating the data signal with the selected calibration to form a pressure indicative signal; and
    transmitting the pressure indicative signal and the range corresponding to the selected calibration.

11. A method as recited in claim 10 further comprising generating a pressure signal in response to the pressure indicative signal and the range status.

12. A method as recited in claim 11 further comprising operating a tire pressure monitoring indicator with the pressure signal.

13. A method as recited in claim 12 wherein the step of transmitting is performed by radio frequency.

14. A method as recited in claim 10 further comprising providing the memory with at least a third calibration data associated with at least a third vehicle structure stored therein.

15. A method as recited in claim 14 wherein the step of selecting calibration data further comprises selecting the calibration data in response to the range to form a selected calibration for the first range, the second range, or the at least a third range.

16. A method as recited in claim 10 further comprising storing calibration data in a memory coupled to a controller on-board the vehicle.

17. A method as recited in claim 10 wherein the data signal corresponds to a voltage.

* * * * *